(12) United States Patent
Mousseau

(10) Patent No.: US 6,520,667 B1
(45) Date of Patent: Feb. 18, 2003

(54) VEHICLE INTERIOR REARVIEW MIRROR ASSEMBLY WITH DISPLAY

(75) Inventor: Rick Mousseau, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/663,036

(22) Filed: Sep. 15, 2000

(51) Int. Cl.⁷ .................. G02B 17/00; F21W 101/02
(52) U.S. Cl. .................. 362/494; 362/326; 359/606; 359/603
(58) Field of Search .................. 362/494, 492, 362/503, 326, 509, 293; 359/839, 838, 603, 604, 606, 831, 837, 211; 40/556

(56) References Cited

U.S. PATENT DOCUMENTS

| | | | |
|---|---|---|---|
| 4,807,096 A | 2/1989 | Skogler et al. ............ 362/142 |
| 4,874,224 A | * 10/1989 | Gutman et al. ............ 359/618 |
| 4,882,565 A | 11/1989 | Gallmeyer .................. 340/461 |
| 4,948,242 A | 8/1990 | Desmond et al. .......... 350/637 |
| 5,122,647 A | 6/1992 | Lynam et al. ............ 250/201.1 |
| 5,178,448 A | 1/1993 | Adams et al. ............. 362/83.1 |
| 5,285,060 A | 2/1994 | Larson et al. ......... 250/214 AL |
| 5,406,414 A | 4/1995 | O'Farrell et al. .......... 359/604 |
| 5,530,240 A | 6/1996 | Larson et al. ......... 250/214 AL |
| 5,538,674 A | * 7/1996 | Nisper et al. ............. 264/1.31 |
| 5,576,687 A | 11/1996 | Blank et al. ............... 340/438 |
| 5,649,756 A | 7/1997 | Adams et al. ............. 362/83.1 |
| 5,669,698 A | 9/1997 | Veldman et al. .......... 362/83.1 |
| 5,671,996 A | 9/1997 | Bos et al. .................. 362/83.1 |
| 5,673,994 A | 10/1997 | Fant, Jr. et al. ............ 362/831 |
| 5,708,410 A | 1/1998 | Blank et al. ............... 340/438 |
| 5,786,772 A | 7/1998 | Schofield et al. .......... 340/903 |
| 5,796,094 A | 8/1998 | Schofield et al. ........ 250/208.1 |
| 5,813,745 A | 9/1998 | Fant, Jr. et al. ........... 362/83.1 |
| 5,820,097 A | 10/1998 | Spooner .................... 248/549 |
| 5,820,245 A | 10/1998 | Desmond et al. .......... 362/83.1 |
| 5,929,786 A | 7/1999 | Schofield et al. ........... 340/903 |
| 5,938,321 A | 8/1999 | Bos et al. .................... 362/494 |
| 5,971,552 A | 10/1999 | O'Farrell et al. ........... 359/871 |
| 6,000,823 A | 12/1999 | Desmond et al. .......... 362/494 |
| 6,005,538 A | 12/1999 | Hoekstra ...................... 345/47 |
| 6,042,253 A | 3/2000 | Fant, Jr. et al. ............. 362/494 |
| 6,087,953 A | 7/2000 | DeLine et al. ........... 340/815.4 |
| 6,124,647 A | 9/2000 | Marcus et al. ............. 307/10.1 |
| 6,124,886 A | 9/2000 | DeLine et al. .............. 348/148 |
| 6,139,172 A | 10/2000 | Bos et al. .................... 362/494 |
| 6,170,956 B1 | * 1/2001 | Rumsey et al. ............. 359/839 |

OTHER PUBLICATIONS

U.S. patent application Ser. No. 09/057,428, filed Apr. 8, 1998, entitled a Vehicle Mounted Remote Transaction Interface System (Attorney Docket DON01 P–696).

U.S. patent application Ser. No. 09/449,121, filed Nov. 24, 1999, entitled Rearview Mirror Assembly with Utility Functions (Attorney Docket DON01 P–778).

(List continued on next page.)

Primary Examiner—Sandra O'Shea
Assistant Examiner—Bao Truong
(74) Attorney, Agent, or Firm—Van Dyke, Gardner, Linn & Burkhart, LLP

(57) ABSTRACT

A vehicle rearview mirror system for a vehicle includes a rearview mirror assembly having a reflective element and a mirror case, which is adapted to mount to a vehicle. The mirror system further includes a display, which has at least one display character, and a display screen, which is provided at the mirror case. The display screen has a central viewing area generally aligned along a viewing axis. The display screen shifts the image of the display character from the display element, which is offset from the viewing axis, to the central viewing area of the display screen. The display screen shifts the image by at least one of refraction and diffraction so that the image of the display characters may be viewed by an occupant of the vehicle.

41 Claims, 6 Drawing Sheets

OTHER PUBLICATIONS

U.S. patent application Ser. No. 09/466,010, filed Dec. 17, 1999, entitled Interior Rearview Mirror Sound Processing System (Attorney Docket DON01 P–787).

U.S. patent application Ser. No. 09/396,179, filed Sep. 14, 1999, entitled Indicator For Vehicle Accessory (Attorney Docket DON01 P–776).

U.S. patent application Ser. No. 09/382,720, filed Aug. 25, 1999, entitled Accessory Module For Vehicle (Attorney Docket DON01 P–768).

U.S. patent application Ser. No. 09/433,467, filed Nov. 4, 1999, entitled Vehicle Interior Mirror Assembly (Attorney Docket DON01 P–783).

U.S. patent application Ser. No. 09/448,700, filed Nov. 24, 1999, entitled Rearview Mirror Assembly With Added Feature Modular Display (Attorney Docket DON01 P–702).

U.S. patent application Ser. No. 60/187,960, filed Mar. 9, 2000, entitled Complete Mirror Based Global Positioning System (GPS) Navigation Solution (Attorney Docket DON01 P–810).

U.S. patent application Ser. No. 09/533,127, filed Mar. 23, 2000, entitled Toggle Assembly For Rearview Mirror (Attorney Docket DON01 P–792).

U.S. patent application Ser. No. 09/244,726, filed Feb. 5, 1999, entitled Rearview Mirror Assembly Incorporating Vehicle Information Display (Attorney Docket DON01 P–734).

U.S. patent application Ser. No. 09/361,814, filed Jul. 27, 1999, entitled Wide Angle Imaging System (Attorney Docket DON08 P–746).

U.S. patent application Ser. No. 09/199, 907, filed Nov. 25, 1998, entitled Wide Angle Image Capture System For Vehicle (Attorney Docket DON01 P–676).

U.S. patent application Ser. No. 09/561,023, filed Apr. 28, 2000, entitled Vehicle–Based Navigation System With Smart Map Filtering, Portable Unit Home–Base Registration And Multiple Navigation System Preferential Use (Attorney Docket DON01 P–819 (utility of P–744)).

U.S. patent application Ser. No. 60/186,520, filed Mar. 2, 2000, entitled Interior Rearview Mirror Asssembly Incorporating A Video Screen (Attorney Docket DON01 P–802).

U.S. patent application Ser. No. 60/218,336, filed Jul. 14, 2000, entitled Interior Rearview Mirror Assembly Incorporating A Video Screen (DON01 P–831).

* cited by examiner

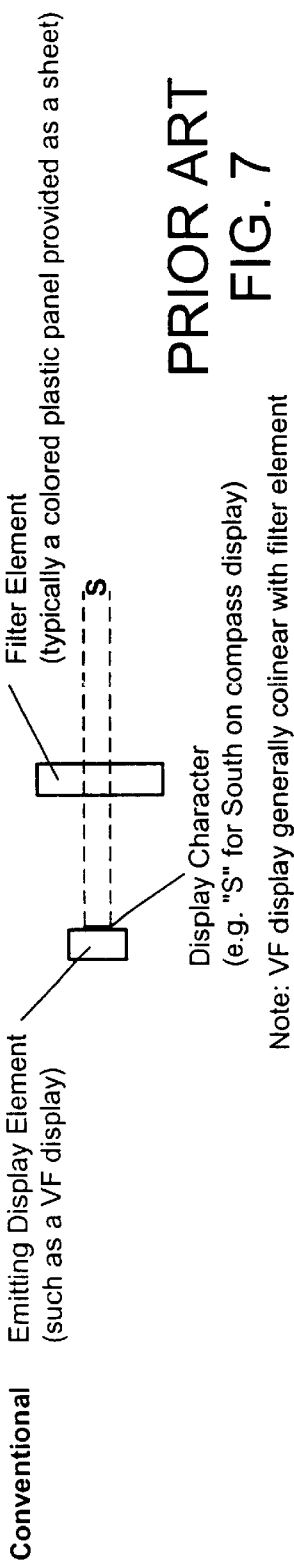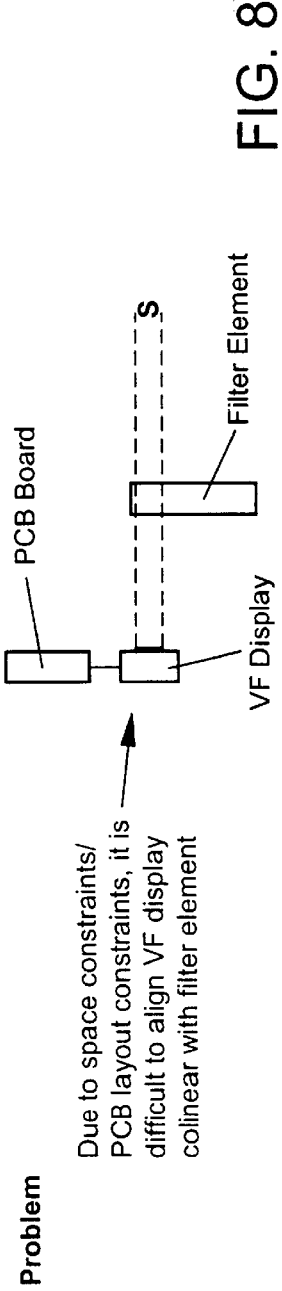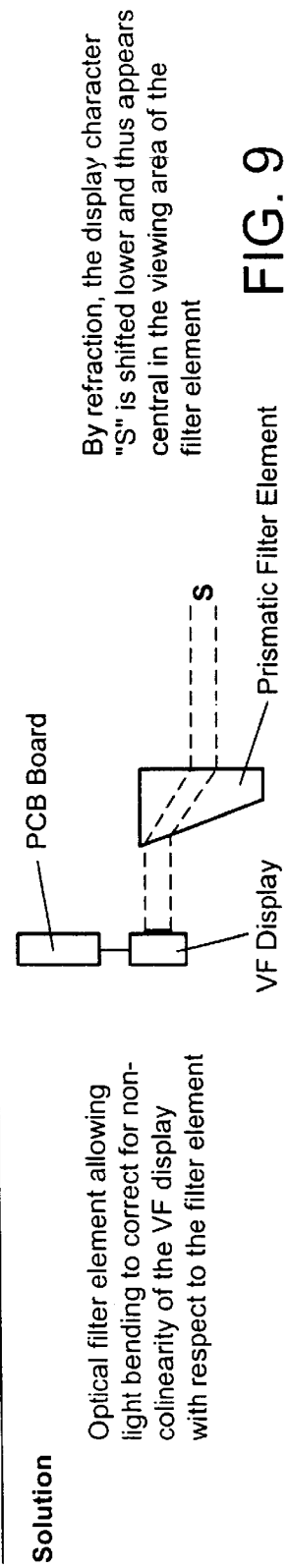

VEHICLE INTERIOR REARVIEW MIRROR ASSEMBLY WITH DISPLAY

TECHNICAL FIELD AND BACKGROUND OF THE INVENTION

The present invention relates to rearview mirror assemblies and, more particularly, to vehicular rearview mirror systems incorporating information displays.

Recently, vehicle mirrors have incorporated a number of electronic and electrical device, including information displays that provide information to the driver or occupants of the vehicle, such as compass headings or warnings relating to the status of the passenger airbag. In commonly assigned co-pending application Ser. No. 09/244,726, filed by Jonathan E. DeLine and Niall R. Lynam on Feb. 5, 1999, entitled REARVIEW MIRROR ASSEMBLY INCORPORATING VEHICLE INFORMATION DISPLAY now U.S. Pat. No. 6,172,613, the disclosure of which is incorporated herein by reference in its entirety, information displays have been provided which include information relating to vehicle or engine status, warning information, such as information relating to oil pressure, levels of fuel, time, temperature, and the like. Furthermore, as described in co-pending commonly owned U.S. patent application Ser. No. 09/057,428, filed Apr. 8, 1998, now U.S. Pat. No. 6,158,655, which is incorporated in its entirety by reference herein, such displays can be used to engage in remote transactions.

With the ever increasing number of devices desired to be housed in the mirror assembly and the increased number of functions provided by these various devices, making more efficient use of available space is highly desirable. In addition, because of the increase in the number of accessories or devices, the rearview mirror assembly process has become more difficult and complex. As a result, the alignment and positioning of these various devices or accessories is more of a challenge. This is especially true for displays.

For a display to produce a character which is visible to the driver, the display element must be properly aligned with the window or filter through which the character is viewed. However, quite often the components comprising a display may be supplied by different vendors and, as a result, may not align properly. In addition, given the proliferation of different mirror designs, vendors are forced to effectively custom manufacture their products to a given style of mirror which ultimately increases the cost of the mirror assembly.

In the interest of the economy and ease of assembly, it is highly desirable to simplify the assembly process and provide mirror components which can accommodate a greater range of manufacturing or assembly tolerances and, further, accommodate different mirror assembly designs.

SUMMARY OF THE INVENTION

The present invention provides a rearview mirror system incorporating a display, which includes one or more display characters. The mirror system includes a mirror assembly having a mirror case and a reflective element, with the case including a window or screen through which characters displayed on a display element can be viewed by the driver or occupants of the vehicle. The screen is adapted to direct the image of the display characters in a manner to improve their alignment on the screen and, thus, the visibility of the display characters even when the display element is not properly aligned with the screen.

In one form of the invention, a vehicle mirror system for vehicles includes a mirror case having a reflective element, with the mirror case being adapted to mount to the vehicle. The mirror system further includes a display element, which has at least one display character, displaying through a display screen. The display screen has a central viewing area generally aligned along a viewing axis. The display screen shifts the image of the display character from the display element, which is offset from the viewing axis, to the central viewing area of the display screen.

In one aspect, the display screen shifts the image by at least one of refraction or diffraction. For example, the display screen may include an outer surface and an inner surface, with the inner surface angled with respect to the outer surface. The display element directs the image of the display characters toward the inner surface whereby the image is shifted by refraction. Preferably the display screen comprises a material, such as a polymeric material, that serves as a light bending element and, preferably, has, for example, an index of refraction in a range of about 1.3 to 1.8, more preferably in a range of about 1.4 to 1.7, and most preferably in a range of about 1.45 to 1.65.

In other aspects, the display screen is adapted to shift the image by light diffraction. For example, the inner surface may be etched with a diffractive surface or a diffractive surface created thereon or therein such as by molding or by mechanical means.

According to another form of the invention, a vehicular interior rearview mirror system for a vehicle includes a rearview mirror assembly having a mirror case and a reflective element, with the mirror case being adapted to mount to an interior of the vehicle. A circuit board is positioned in the mirror case, which includes a display element for displaying at least one display character. The mirror system further includes a display screen which is provided at the mirror case, and which has a display surface with a central viewing area. The display screen is adapted to shift the image of the display character to generally align the image in the central viewing area with the screen shifting the image by at least one of diffraction or refraction.

In one aspect, the central viewing area is aligned along a viewing axis, with the display element offset from the viewing axis. In another aspect, the display screen preferably comprises a filter.

According to yet other aspects of the invention, the screen is located on a perimeter portion of the mirror case and preferably located below the reflective element. For example, the screen may form a chin area of the mirror case. Alternately, the screen may be positioned above the reflective element to form an eyebrow area of the mirror case.

In yet another form of the invention, a vehicle interior rearview mirror system for a vehicle includes a rearview mirror assembly having a mirror case and a reflective element. The mirror case is adapted to mount to an interior of the vehicle. The mirror system further includes a display element for displaying at least one display character and a refractive element having a central viewing display surface aligned along a viewing axis for viewing by an occupant of the vehicle. The image of the display character is offset from the viewing axis, with the refractive element shifting the image of the display character to the central viewing display area for viewing by the occupant of the vehicle.

In one aspect, the refractive element preferably comprises a plastic refractive element. For example, the refractive element may have an outer surface and an inner surface, with the inner surface angled with respect to the outer surface. Thus, when the image is directed toward the inner surface, the refractive element shifts the image to the central viewing area on the outer surface of the refractive element. In further aspects, the refractive element has a wedge-shaped cross-section.

In another aspect, the mirror system further includes a circuit board with the display element electrically coupled to the circuit board. Preferably, the display element is mounted to the circuit board.

Advantages provided by this invention include a simplified assembly process, which will accommodate greater variations in the manufacturing or assembly processes of the various components which are to be mounted within the mirror case. Additionally, the invention provides a display which increases the visibility of the display characters of the display in the vehicle mirror system.

These and other objects, advantages, purposes, and features of the invention will become more apparent from the study of the following description taken in conjunction with the drawings.

BRIEF DESCRIPTION OF THE DRAWINGS

FIG. 7 is a schematic representation of a prior art arrangement of a display element, which is generally collinear with a display screen of a conventional mirror system illustrating the position of the display character as viewed by an occupant of the vehicle;

FIG. 8 is a schematic representation of a display element which is mis-aligned with the display screen and the position of display character as viewed by an occupant of the vehicle; and FIG. 9 is a schematic representation of a display element of the present invention and a display screen which shifts the display characters of the display element to a central viewing area of the display screen.

DESCRIPTION OF THE PREFERRED EMBODIMENTS

Figure 1:
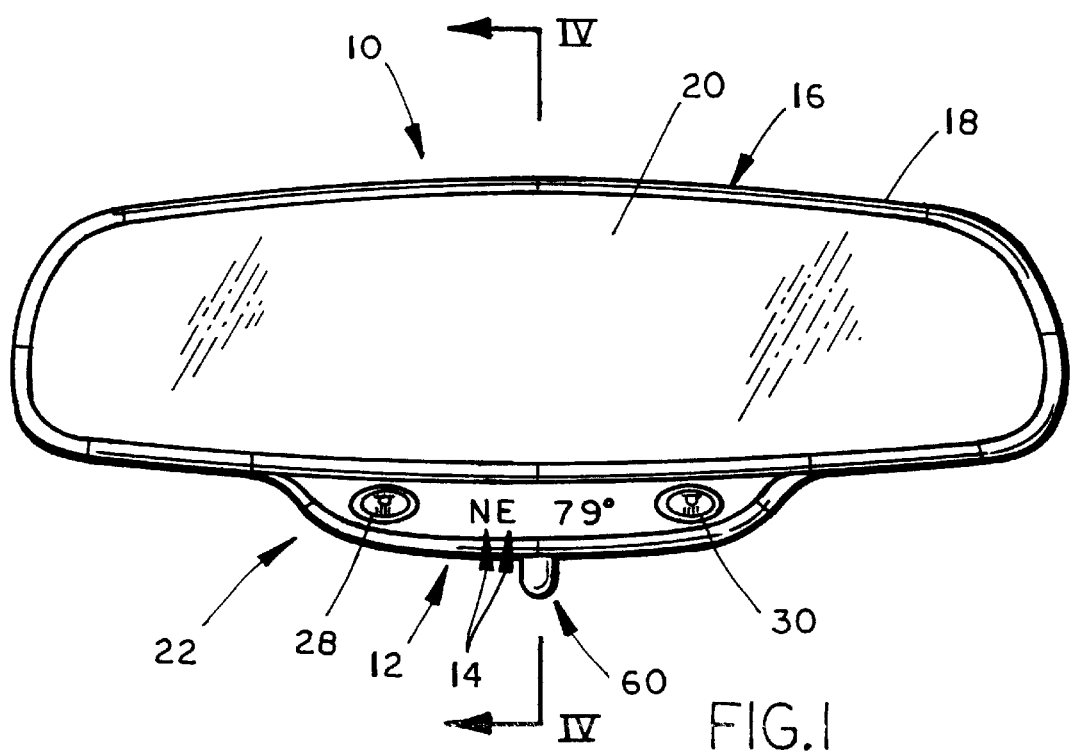
FIG. 1 is a front elevation view of a vehicle mirror system of the present invention.
Figure 1A:
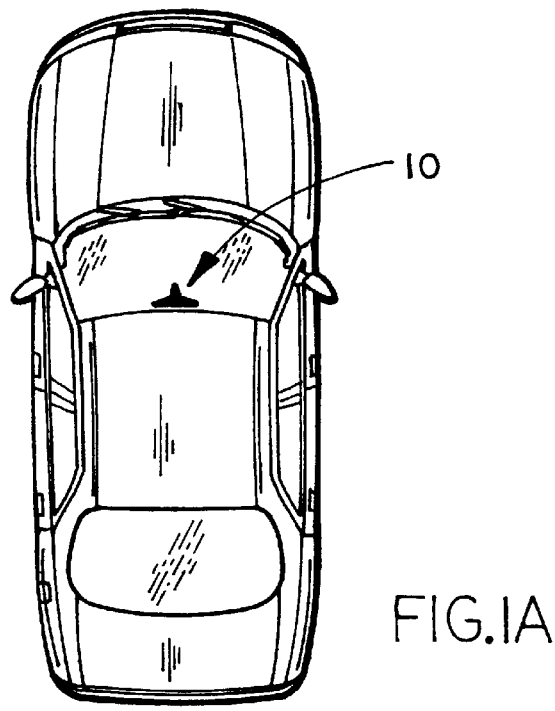
FIG. 1A is a plan view of a vehicle incorporating the vehicle mirror system of the present invention and an interior rearview mirror assembly, which is mounted to the inner surface of the vehicle windshield.
Figure 2:
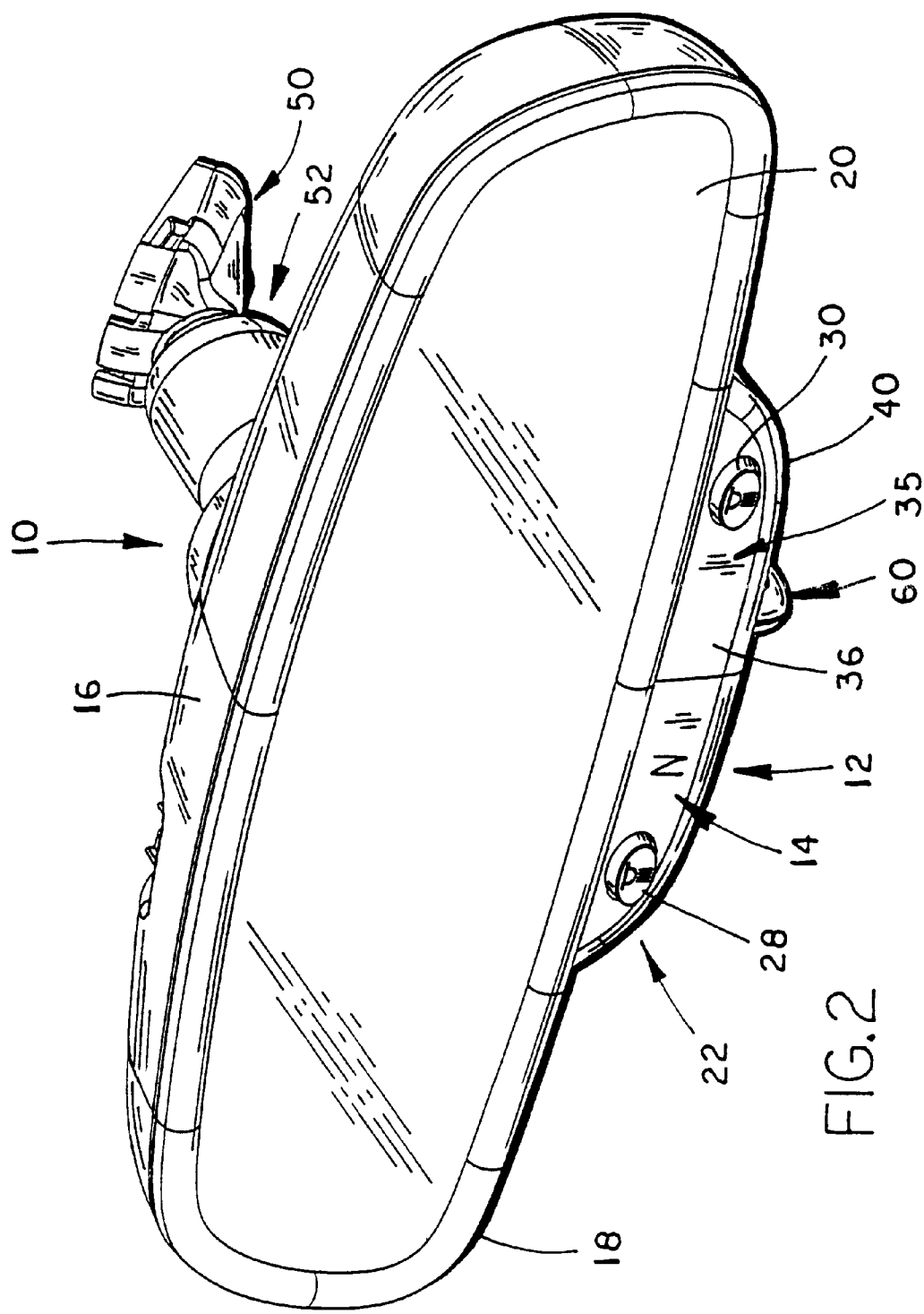
FIG. 2 is a perspective view of the vehicle mirror system of FIG. 1, which illustrates a display incorporated at a chin area of the mirror case of the mirror system.

Referring to FIG. 1, the numeral 10 generally designates a vehicle mirror system for vehicles of the present invention, which incorporates an improved display 12 for displaying one or more display characters 14, for viewing by the driver or occupant of the vehicle when the mirror system 10 is mounted to a vehicle, such as in the interior of the vehicle including, for example to a front windshield or headliner or header section of the vehicle.

Mirror system 10 includes a mirror case 16, with a retaining rim or bevel 18, and a mirror reflective element 20. Display 12 is preferably located at a peripheral portion of mirror case 16, such as at a lower peripheral portion in which display 12 forms an enlarged chin area 22. It should be understood, however, that display 12 may be provided in other locations, for example, at an upper peripheral portion such as to form an enlarged eyebrow area.

Optionally, display 12 includes one or more user actuatable interfaces, for example, user actuatable buttons or switches 28 and 30, which are mounted on a printed circuit board 32, as will be more fully described below, and which may provide a plurality of functions, including activating systems such as an ONSTAR system. Furthermore, switches or buttons 28, 30 may be used to activate or de-activate the display and/or toggle between displays or units of displays, such as between Fahrenheit and Celsius temperature readings. Optionally, buttons 28 and 30 may be back lit or otherwise illuminated by an illumination source, such as an LED or the like, which is provided, for example, on circuit board 32.

In addition, mirror system 10 may incorporate other utility functions, such as those described in application entitled REARVIEW MIRROR ASSEMBLY WITH UTILITY FUNCTIONS, filed Nov. 24, 1999, by Barry W. Hutzel, Niall R. Lynam, and Darryl P. DeWind, now U.S. Pat. No. 6,428,172 (Attorney Docket DON01 P-778), which is herein incorporated by reference herein in its entirety. Alternately or in addition, mirror system 10 may incorporate a microphone or a plurality of microphones preferably to provide hands-free input to a wireless telecommunication system such as the ONSTAR™ system in use in General Motors vehicles. Most preferably such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein. Microphones, sound processing systems, and other accessories suitable to use in the mirror systems of the present invention are disclosed in co-assigned U.S. patent applications Ser. Nos.: 09/466,010 filed Dec. 17, 1999, now U.S. Pat. No. 6,420,975; 09/396,179 filed Sep. 14, 1999, now U.S. Pat. No. 6,278,377; 09/382,720 filed Aug. 25, 1999, now U.S. Pat. No. 6,243,003; 09/449,121 filed Nov. 24, 1999, now U.S. Pat. No. 6,428,172; 09/433, 467 filed Nov. 4, 1999, now U.S. Pat. No. 6,326,613; and 09/448,700 filed Nov. 24, 1999, now U.S. Pat. No. 6,329, 925, the entire disclosures of all of which are hereby incorporated by reference herein.

Figure 3:
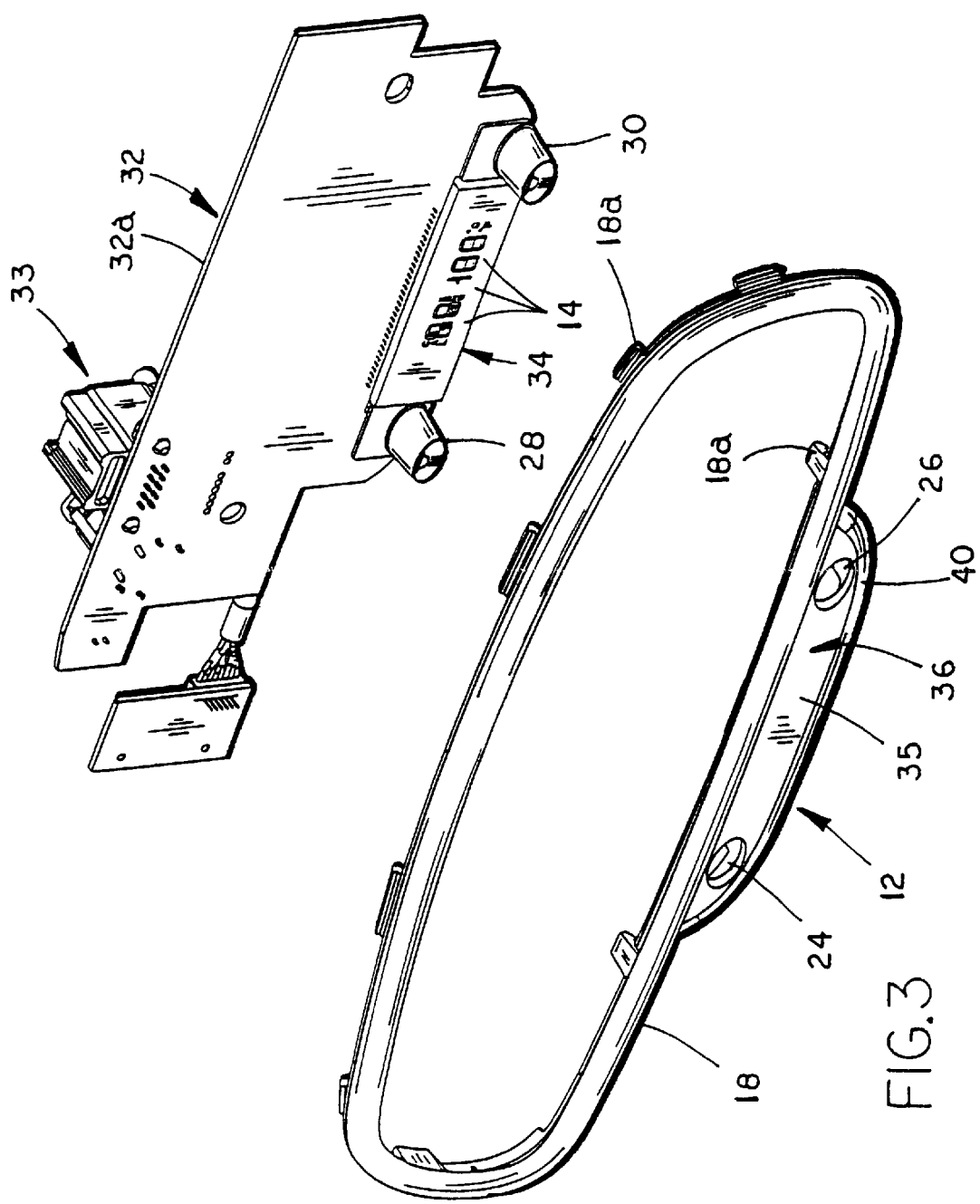
FIG. 3 is an exploded perspective view of a retaining rim, a display element, and a circuit board of the mirror system of FIG. 1.

Referring to FIG. 3, positioned in casing 16 is circuit board 32. Circuit board 32 includes a display element 34 and, further, preferably supports and powers user actuatable buttons 28 and 30. Preferably, display element 34 comprises a light emitting display, such as a vacuum fluorescent display, a light emitting diode display, a field emission display, an electro-illuminescent display or the like. Display element 34 includes one or more display characters 14, which provide information by way of indicia, such as alphanumeric indicia or symbolic or graphical indicia, including such as icons, and may include passenger safety information, such as passenger side inflatable restraint (PSIR) status or supplemental inflatable restraint (SIR) status. Display element 34 preferably includes alphanumeric indicia and optionally may include multiple pixel, reconfigurable, addressable, displays or optionally may include a scrolling display. Display characters 14 may also include information relating to compass headings vehicle status, environment, such as temperature, time, or the like.

Characters 14 are viewed on a display screen 36, which is supported at lower perimeter of retaining rim 18. Display screen 36 preferably is formed from a plastic material, such as acrylic or polycarbonate, but may optionally, comprise a glass element. The display element is typically obtained from a display element manufacture, which provides the display element with fixed length leads. In addition, it is desired that these display elements are mounted to the circuit board by the manufacture of the circuit board, which is then shipped to the mirror assembly location. In this manner, the circuit board is pre-assembled with the display element, which reduces the mirror assembly processing time. To accommodate the variations in location of these display elements on pre-assembled circuit boards, the present invention provides a means to shift the image emitted by the display characters on the display element so that they properly align with the display screen on the mirror assembly housing. As will be more fully described below, display screen 36 is adapted to shift the image of display characters 14 so that they can be viewed through a central viewing area 35 of screen 36 even though display element 34 is not aligned with the central viewing area 35.

Preferably, display element 34 is soldered to printed circuit board 32, which is positioned within mirror case 16. Alternately, display element 34 may be removably mounted to circuit board 32. Circuit board 32 may support other devices, such as a compass sensor circuit or one or more light assemblies, such as map lights, or the like, so that devices to be placed in mirror case 16 can be pre-assembled on circuit board 32 prior to placement in the case which substantially improves the manufacturing process of mirror system 10. For example, circuit board 32 may include electronic and electric devices, including a blind spot detection system, such as the type disclosed in U.S. patent application Ser. No. 08/799,734 entitled VEHICLE BLIND SPOT DETECTION AND DISPLAY SYSTEM, invented by Schofield et al., and filed Feb. 12, 1997, now U.S. Pat. No. 5,786,772, or rain sensor systems, for example rain sensor systems which include windshield contacting rain sensors, such as described in U.S. Pat. No. 4,973,844 entitled VEHICULAR MOISTURE SENSOR AND MOUNTING APPARATUS THEREFORE, or non-windshield contacting rain sensors, such as described in PCT International Application PCT/US94/05093 entitled MULTI-FUNCTION LIGHT SENSOR FOR VEHICLE, published as WO 94/27262 on Nov. 24, 1994, the disclosures of which are hereby incorporated by reference herein in their entireties. Also, circuit board 32 may include circuitry for mirror mounted video cameras, which are used to visually detect the presence of moisture on the windshield and actuate windshield wipers accordingly, such as described in U.S. application Ser. No. 08/621,863, filed Mar. 25, 1996 now U.S. Pat. No. 5,796,094, entitled VEHICLE HEADLIGHT CONTROL USING IMAGING SENSOR, by Schofield et al., now U.S. Pat. No. 5,796,094, or mirror mounted cameras for vehicle internal cabin monitoring disclosed in U.S. Pat. Nos. 5,877,897 and 5,760,962, both commonly assigned to Donnelly Corporation, which are hereby incorporated herein by reference in their entireties. Other electronic or electrical devices mounted to circuit board 32 may include for example home access transmitters, a high/low or daylight running beam low headlight controller, a hands free cellular phone attachment, a video device, such as a video camera for internal cabin surveillance and/or video telephone function, remote keyless entry receiver, a compass, a seat occupancy detector, a trip computer, an intrusion detector, and the like. As used in the specification, an electrical device encompasses an electrically operated accessory or device such as a map light or the like. An electronic device encompasses an electronic circuit board or PCB (such as an automatic light dimming circuit board, a compass sensing and directional circuit board or the like) or electron devices or circuits or systems, including electron tubes, microprocessors, amplifiers, transistors, and other devices that do the work of electron tubes. In addition, by placing or mounting the devices on a common printed circuit board, the use of common parts is facilitated and, therefore, the number of parts can be reduced in the assembly process, which ultimately reduces costs as well as improves the assembly process.

In order to connect the various electrical or electronic devices in case 16 to the vehicle electrical system and optionally to on-board computers, circuit board 32 includes a connector 33, such as a 16-pin connector, mounted to rear surface 32a (FIG. 3). When mirror assembly 10 is fully assembled, connector 33 aligns with an access opening (not shown) provided on back wall 16c of case 16 (FIGS. 4, 4A and 4B) through which connector 33 is then connected to the vehicle electrical system and optional on board computer by way of a plug connector and cable.

Figure 4:
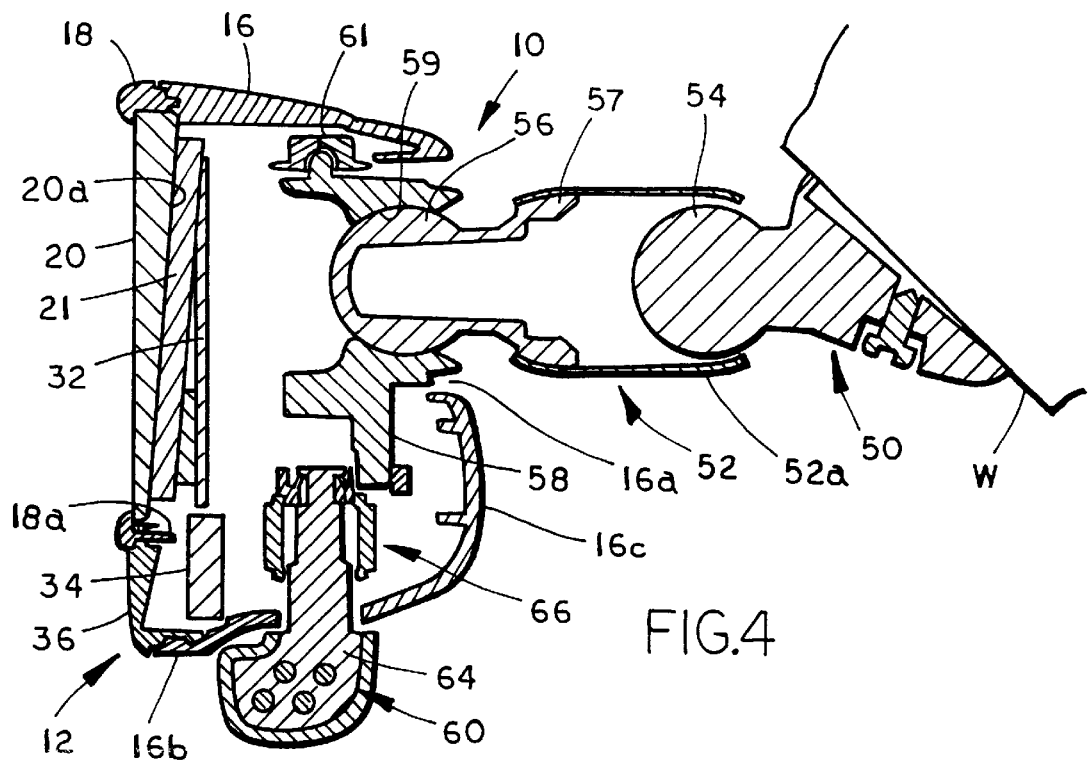
FIG. 4 is a cross-section view taken along line IV—IV of FIG. 1.

As best seen in FIG. 4, circuit board 32 is mounted in casing 16 behind reflective element 20, with display element 34 shifted up from display screen 36. In preferred form, display screen 36 shifts or directs light from display element 34 by refraction so that the display characters on display element 34 can be viewed through central viewing area 35 of display screen 36 so that the driver or occupant of the vehicle can view the information. As previously described, display 12 provides information to a driver or occupant of the vehicle and may display information, such as vehicle status, or information relating to an accessory of the vehicle. For example, display 12 may include information relating to a global positioning system (GPS), temperature, tire pressure indicator, fuel levels, a compass system, or the like, with mirror system 10 optionally incorporating the mirror based global positioning system, such as the type disclosed in commonly assigned, co-pending U.S. provisional Pat. application Ser. No. 60/187,960, filed Mar. 9, 2000, by McCarthy et al., for COMPLETE MIRROR BASED GLOBAL POSITIONING SYSTEM (GPS) NAVIGATION SOLUTION now U.S. patent application Ser. No. 09/799,414, the disclosure of which is herein incorporated by reference in its entirety.

Figure 4A:
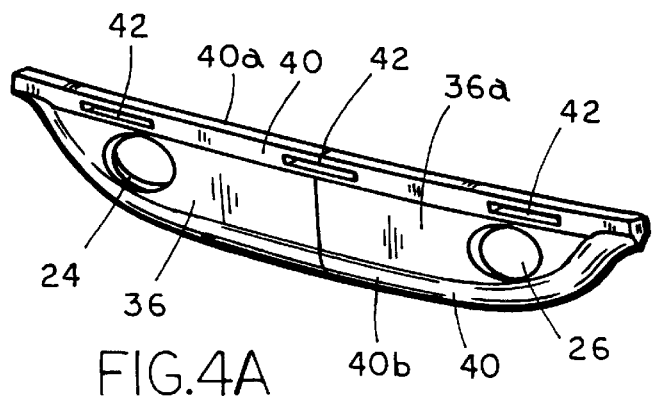
FIG. 4A is a front perspective view of the display screen of the present invention.
Figure 4B:
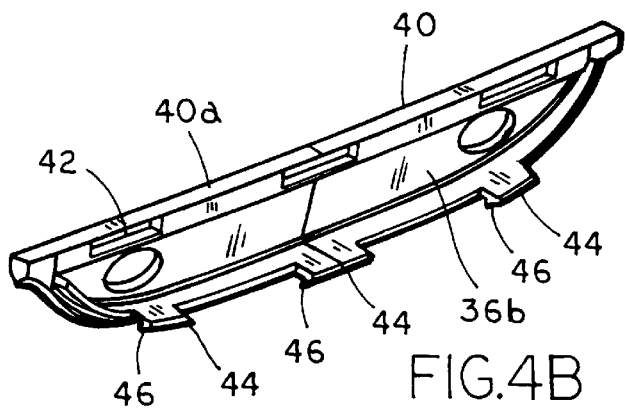
FIG. 4B is a rear perspective view of the display screen of FIG. 4A.

Referring to FIG. 4A, display 12 includes a central portion which forms display screen 36 and a perimeter portion 40 which provides a mounting flange for mounting display screen 36 to casing 16. As best seen in FIG. 4A, upper portion 40a of perimeter portion 40 includes a plurality of elongate openings 42. Referring to FIG. 4, retaining rim 18 includes a plurality of mounting flanges 18a which extend through openings 42 and also into corresponding receiving structures formed on case 16. Flanges 18a are preferably heat staked, for example, in openings 42 to secure display screen 36 to retaining rim 18. Lower portion 40b of perimeter portion 40 includes a plurality of inwardly projecting flanges 44 with cam surfaces 46 to provide a snap fit arrangement of display screen 36 onto casing wall 16b, as seen in FIG. 4. As previously noted, in preferred form, display screen 36 is formed from a plastic material, such as acrylic or polycarbonate, or may be formed from a glass element, and is more preferably formed from a colored or tinted material to provide a filter so that when character displays 14 are not illuminated, the front surface 36a of screen 36 appears to be a solid or opaque color. Alternately, screen 36 may include a film applied thereto to form a filter. In addition, screen 36 preferably includes a pair of openings 24, 26 through which user actuated buttons 28 and 30 extend when circuit board 32 is mounted in casing 16.

Figure 5:
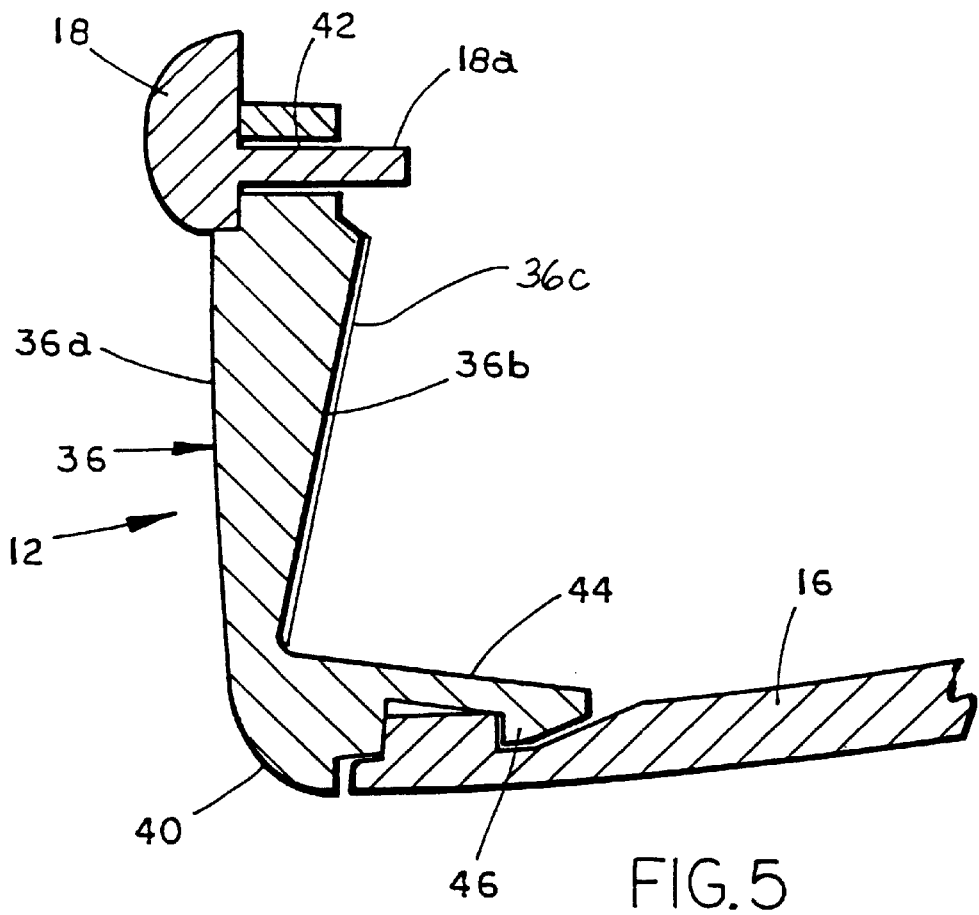
FIG. 5 is an enlarged view of the display screen shown mounted to the mirror case.
Figure 6:
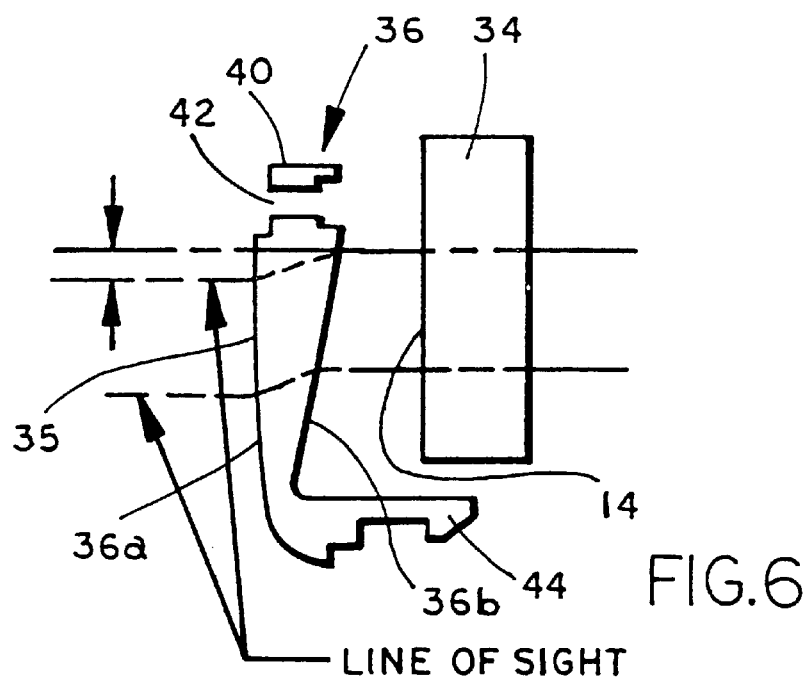
FIG. 6 is an enlarged view similar to FIG. 5 illustrating the display element relative to the display screen of FIG. 5.

As best seen in FIG. 5, display screen 36 includes an inner surface 36b which is angled with respect to outer surface 36a of screen 36 to form a refractive element. For example, the angle may be varied and depends on the material properties and, further, on the degree of shifting that is desired. For example, in the illustrated embodiment, the angle is approximately 15°. Preferably, display screen 36 is formed from a material, such as a polymeric material, having a refractive index in a range of about 1.3 to 1.8 and, more preferably, in a range of about 1.4 to 1.7 and, most preferably, in a range of about 1.45 to 1.65. As a result, screen 36 redirects light from display element 34 so that the image of the display characters 14 is shifted to generally appear in the central viewing area region 35 of screen 36. As best seen in FIGS. 6 and 8, the light rays forming the image of the display characters that are emitted by display element 34 are bent downwardly when they enter screen 36 through inner surface 36b and then are redirected in a generally parallel direction with the incoming rays from display element 34 when the light rays exit through outer surface 36a. In this manner, display screen 36 shifts the image of the characters displayed on display element 34 downwardly (in this application) to the central viewing area 35 of display screen 36 by refraction. As a result, even though display element 34 is not aligned along the viewing axis of central viewing area 35, the display characters of display element 34 appear to be generally aligned along the central axis of viewing area 35 of screen 36 so as to be visible by the driver or occupants of the vehicle.

The luminous intensity of display characters 14 should be of sufficient intensity so as to be readily visible by an occupant of the vehicle even under high ambient lighting conditions such as during daylight driving. Optionally, the intensity of the display characters may be reduced during night time driving to a lower luminous light intensity, for example by using a signal, typically a pulse with modulated signal, from the vehicle that causes the screen 36 to dim in tandem with the lights and the instrument panel. Another option is to use mirror mounted photo sensor or sensors that cause the screen 36 to dim when low ambient conditions are detected, such as described in U.S. Pat. Nos. 5,146,313 and 5,285,060, the disclosures of which are incorporated in their entirety by reference herein.

Alternately, screen 36 may include parallel inner and outer surfaces, with the inner surface etched with a diffractive surface, in which case screen 36 bends the image using diffraction. In addition, screen 36 can bend the image using a combination of diffraction and refraction. Reference is made to U.S. Pat. No. 5,538,674, entitled METHOD FOR REPRODUCING HOLOGRAMS, KINOFORMS, DIFFRACTIVE OPTIC ELEMENTS AND MICROSTRUCTURES, which is commonly assigned to Donnelly Corporation of Holland, Mich., for a suitable method of forming the diffractive properties, which is herein incorporated by reference herein in its entirety. In addition, screen 36 may be molded with diffractive bodies suspended in the screen body to form the diffractive properties.

In contrast to conventional display screens illustrated in FIGS. 6 and 7, display screen 36 of the present invention bends the light emitted from the display element to correct for the non-colinearity of the display element with respect to the display screen. Conventional display screens, on the other hand, display the characters at the same general elevation of the display character illuminated on the display element; thus, when the display element is positioned offset from the central area of the display screen, the character displayed will appear off-center and often be blocked by the bezel portion of the mirror assembly. In contrast, as previously described, the present invention shifts the image such that the displayed image appears to be generally centered in the central viewing area of the filter element.

In the illustrated embodiment, reflective element 20 comprises a prismatic element; however, it can be appreciated that reflective element 20 may comprise an electrochromic reflective element, with the electrochromic circuitry provided on circuit board 32. Suitable electrochromic elements are described in commonly assigned U.S. Pat. Nos. 5,140,455 and 5,151,816 or a solid state electrochromic medium such as described in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Grandquist, Eds., Optical Engineering Press, Washington (1990), the disclosures of which are hereby incorporated by reference herein in their entireties. Other suitable electrochromic reflectors are described in U.S. Pat. Nos. 5,567,360; 5,525,264; 5,610,756; 5,406,414; 5,253,109; 5,076,673; 5,073,012 or 5,117,346, which are all commonly assigned to Donnelly Corporation, the disclosures of which are herein incorporated by reference in their entireties.

In preferred form, reflective element 20 is retained in a rear facing opening of case 16 by retaining rim 18. Retaining rim 18 and casing 16 are both preferably formed from a resinous polymeric material or plastic and, more preferably, a melt processible plastic and, most preferably, an engineered polymer, for example an ABS plastic. Retaining bezel 18 extends around and over the perimeter portion of reflective element 20 and engages a plurality of structures provided at the perimeter portion of case 16 to thereby support and retain reflective element 20 in case.

Mounted to rear surface 20a of reflective element 20 is one or more foam or resilient pads 21, which provide additional support for the reflective element 20 when retaining rim 18 is mounted to case 16. Pads 21 act as shock absorbers to reduce the vibration in reflective element 20 and further reduce the risk of breaking the glass forming reflective element 20 during impact. For example, pads 21 may comprise cross-linked polyethylene foam.

As previously noted, mirror system 10 may be mounted to an interior of a vehicle, and in the illustrated embodiment, is configured for mounting to a windshield W of the vehicle on a break-away mount 50. Case 16 is mounted to break-away mount 50 by support 52, which preferably permits multi-axis positioning of casing 16 about support 52. As illustrated, support 52 preferably comprises a dual ball mount arrangement, which includes a tubular member 52a that receives a ball mount 54 from break-away mount 50 and supports a second ball mount 56 for engaging case 16. Ball mount 56 couples to a bracket assembly 58 and is received through opening 16a in back wall 16c of case 16 in socket 59 of bracket assembly 58. Ball mounts 54 and 56 are preferably zinc ball studs, which are respectively insert molded into break-away mount 50 and base 57. Break-away mount 50 includes a body preferably formed from a resinous polymeric or plastic material and, more preferably, from a mineral filled polypropylene, such as glass or mineral filled nylon, for example RENY252A.

In the illustrated embodiment, bracket assembly 58 forms part of the pivot structure for mirror system 10 and is pivotally mounted to a frame 61, which is mounted to case 16 and is actuated to pivot about frame 61 to thereby pivot case 16 about support 52 by a toggle assembly 60. Reflective element 20 is adjusted between its day time viewing position and its night time viewing position by toggle assembly 60 when toggle assembly 60 pivots casing 16 about ball mount 56. Preferably toggle assembly 60 includes a knob 64 and a cam 66, which is pivotally positioned within bracket assembly 58, such that rotation of knob 64 causes pivoting of mirror case 16, including bezel 18 and reflective element 20, relative to support 52 such as disclosed in commonly assigned U.S. patent application Ser. No. 09/448,700, filed Nov. 24, 1999, by Skiever et al., entitled REARVIEW MIRROR ASSEMBLY WITH ADDED FEATURE MODULAR DISPLAY, now U.S. Pat. No. 6,329,925, the disclosure of which is hereby incorporated in its entirety by reference herein. Alternately, toggle assembly 60 may comprise the type disclosed in commonly assigned U.S. patent application Ser. No. 09/533,127, filed Mar. 23, 2000, by Ralph A. Spooner and Jerry L. Beck, entitled TOGGLE ASSEMBLY FOR REARVIEW MIRROR, now U.S. Pat. No. 6,318,870, the disclosure of which is hereby incorporated by reference in its entirety.

Other suitable mounting brackets or mounting arrangements are also disclosed in U.S. Pat. Nos. 5,487,522; 5,671, 996; 5,820,097; 5,615,857; 5,330,149; 5,100,105; 4,930, 742; or 4,936,530 or U.S. patent application Ser. No. 08/781, 408, filed Jan. 10, 1997, now U.S. Pat. No. 5,820,097, all commonly assigned to Donnelly Corporation, the entire disclosures of which are hereby incorporated herein by reference.

Mirror system 10 may also incorporate a plurality of other features, including, for example map lights, such as disclosed in commonly assigned U.S. Pat. Nos. 5,669,698; 5,820,245; 5,671,996; 5,813,745; 5,178,448; 4,733,336; and 4,646,210, the disclosures of all of which are herein incorporated by reference in their entireties. In addition, mirror system 10 may incorporate a microphone module, such as described in commonly assigned application Ser. No. 09/382,720, entitled ACCESSORY MODULE FOR VEHICLE, filed by Jonathan E. Deline and Niall R. Lynam on Aug. 25, 1999, now U.S. Pat. No. 6,243,003, the disclosure of which is herein incorporated by reference in its entirety. Such microphone modules may be used, for example to provide a hands-free input to wireless communication systems such as an ONSTAR system used in General Motors vehicles. In addition or alternatively, such microphones provide input to an audio system that transmits and communicates wirelessly with a remote transceiver, preferably in a voice recognition mode. Such systems are described in U.S. patent application Ser. No. 09/382,720, filed Aug. 25, 1999, now U.S. Pat. No. 6,243,003, the disclosure of which is herein incorporated by reference in its entirety. In this manner, desirably all the electronics and electrical devices, with the exception of, for example a microphone module, may be supported, formed and/or housed on circuit board 32. Thus, the mirror assembly can be quickly and easily assembled with circuit board 32 which forms a carrier member or cartridge or modular unit/ assembly which can be quickly inserted into the cavity of casing 16.

In addition, display 12 may include a display of the speed limit applicable to the location of where the vehicle is traveling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, such as display screen 36, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle or wired together. Thus, for example, an interior electrochromic mirror and an exterior electrochromic mirror is connected by at least one wire in order to transmit control signal and the like. With BLUETOOTH and similar systems, control commands can be broadcast between the interior mirror and the exterior mirror (and vice versa) without the need for physical wiring interconnecting the two. Likewise, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the interior mirror assembly, and tire pressure status can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital, and analogue communication and vehicle/external wireless connectivity, preferably using the interior and/or exterior mirror assemblies as transceiver/display/user-interaction sites. Electronic accessories to achieve the above can be accommodated in casing 16, and/or elsewhere in the interior rearview mirror assembly (such as in the housing disclosed in U.S. patent application Ser. No. 09/433,467 (Attorney Docket No. P-783) filed Nov. 4, 1999 entitled VEHICLE INTERIOR MIRROR ASSEMBLY to Patrick Heslin and Niall R. Lynam, now U.S. Pat. No. 6,326,613.

As described, the rearview mirror assembly of the present invention can include a wide variety of electrical and electronic devices incorporated therein and, further, may incorporate utility functions, such as described in U.S. Pat. No. 6,428,172, entitled REARVIEW MIRROR ASSEMBLY WITH UTILITY FUNCTIONS, filed Nov. 24, 1999, by Barry W. Hutzel, Niall R. Lynam, and Darryl P. DeWind (Attorney Docket DON01 P-778), which is herein incorporated by reference herein in its entirety. For example, rearview mirror assemblies may include: Antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. application Ser. No. 09/244,726, filed Feb. 5, 1999, now U.S. Pat. No. 6,172,613; blind spot detection systems, such as disclosed in U.S. Pat. Nos. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433,467, now U.S. Pat. No. 6,326,613; a remote keyless entry receiver; map lights, such as disclosed in U.S. Pat. Nos. 5,938,321, 5,813,745, 5,820,245, 5,673,994, 5,649,756, or 5,178,448; microphones and/or speakers, such as disclosed in U.S. patent applications Ser. No. 09/361,814, filed Jul. 27, 1999, now U.S. Pat. No. 6,201,642, and 09/199,907, filed Nov. 25, 1998; a compass, such as disclosed in U.S. Pat. No. 5,924,212; seat occupancy detector; a trip computer; an ONSTAR System or the like, with all of the referenced patents and applications being commonly assigned to Donnelly Corporation, the disclosures of which are herein incorporated by reference in their entireties. Other features which can be incorporated include: A baby minder system, such as the vehicle interior monitoring system described in U.S. Pat. Nos. 5,877,897 and 5,760,962 or the rear vision system described in pending U.S. patent applications Ser. No. 09/361,814, filed Jul. 27, 1999, now U.S. Pat. No. 6,201,642, and Ser. No. 09/199,907, filed Nov. 25, 1998, and U.S. patent application Ser. No. 09/422,467, (Attorney Docket No. P-783), filed Nov. 4, 1999, entitled VEHICLE INTERIOR MIRROR ASSEMBLY to Patrick Heslin and Niall R. Lynam, now U.S. Pat. No. 6,326,613, all of which are incorporated by reference in their entireties herein.

For example, in the case of an interior rearview mirror assembly, a camera, such as a CMOS or CCD camera, can be mounted in mirror system 10 to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources, and the like, and most preferably such non-incandescent sources are low power and are directed low intensity sources, such as described in U.S. Pat. No. 5,938,321, and application entitled INTERIOR MIRROR ASSEMBLY FOR A VEHICLE INCORPORATING A SOLID-STATE LIGHT SOURCE, Ser. No. 09/287,926, filed Apr. 7, 1999, now U.S. Pat. No. 6,139,172, which are incorporated herein by reference in their entireties. A baby minder camera may be mounted as a part of the rearview mirror assembly and, most preferably, may be mounted as a part of a header, including a front header of a roof or a rear header of a roof. It may be desirable to mount a baby minder camera to the rear header of a roof when it is desirable to view rear facing child support seats. Most preferably, a plurality of at least two, more preferably at least four, and most preferably at least six LEDs are mounted with a camera (such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, non-incandescent camera illumination sources can be illuminated whenever the ignition switch is on to operate the vehicle or at least when the ignition switch is placed in "an accessory on" position so that both the camera and illumination lights are operating on vehicle battery power even when parked. Alternately, the illumination lights can be operational only when the baby minder camera is selected to be operational. While it is preferred to use non-incandescent lights, such incandescent light sources can be used and more preferably high intensity, low current incandescent light sources. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible. For example, a camera, such as a CMOS or CCD camera, can be mounted to view the rear seat area of the vehicle so that the driver can view what is occurring, such as in a rear seat mounted baby seat or with a rear seat passenger such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers.

Furthermore, the mirror assemblies of the present invention may incorporate a navigation system, such as described in co-pending provisional application Ser. No. 60/131,593, filed Apr. 29, 1999, entitled VEHICLE-BASED NAVIGATION SYSTEM WITH SMART MAP FILTERING, PORTABLE UNIT HOME-BASE REGISTRATION AND MULTIPLE NAVIGATION SYSTEM PREFERENTIAL USE, which is herein incorporated by reference in its entirety. Alternately or in addition, the modular aspects of the present invention can be combined with or incorporate a wide variety of other interior rearview mirror assemblies including electrically operated compass mirrors such as disclosed in U.S. Pat. No. 5,253,109; electrically operated interior rearview mirrors incorporating map reading lights such as disclosed in U.S. Pat. Nos. 4,646,210, 4,733,336, 4,807,096, and 5,178,448; and electrically operated automatically dimming mirrors such as described in U.S. Pat. Nos. 4,793,690, 4,799,768, 4,886,960, and 5,193,029; mirror assemblies incorporating GPS such as disclosed in U.S. patent application Ser. No. 08/569,851, filed Dec. 8, 1995, by Roger L. Veldman and Desmond O'Farrell entitled A VEHICLE GLOBAL POSITIONING SYSTEM NAVIGATIONAL AID, now U.S. Pat. No. 5,971,552; mirrors including head light controls, such as disclosed in U.S. patent application Ser. No. 08/621,863, filed Mar. 25, 1996, entitled VEHICLE HEADLIGHT CONTROL USING IMAGING SENSOR, now U.S. Pat. No. 5,796,094; mirrors incorporating displays, such as disclosed in U.S. patent application Ser. No. 09/244,726, filed Feb. 5, 1999, entitled REARVIEW MIRROR ASSEMBLY INCORPORATING VEHICLE INFORMATION DISPLAY, now U.S. Pat. No. 6,172,613, and U.S. Pat. No. 5,530,240, entitled DISPLAY FOR AUTOMATIC REARVIEW MIRROR; mirrors incorporating blind spot detection systems, such as disclosed in U.S. Pat. No. 5,530,240, U.S. Pat. No. 5,576,687, and U.S. patent application Ser. No. 08/799,735, entitled VEHICLE BLIND SPOT DETECTION AND DISPLAY SYSTEM, filed Feb. 12, 1997; and mirrors incorporating remote transaction systems, such as disclosed in U.S. patent application Ser. No. 09/057,428, filed Apr. 8, 1998, entitled A VEHICLE MOUNTED REMOTE TRANSACTION INTERFACE SYSTEM, now U.S. Pat. Nos. 6,158,655, and 5,798,575, all commonly assigned to Donnelly Corporation, Holland Mich., the disclosures of which are herein incorporated by reference in their entireties.

In addition, reflective element 20 may include one or more video screens, such as described in co-pending provisional U.S. patent applications Ser. No. 60/186,520, filed Mar. 2, 2000, entitled INTERIOR REARVIEW MIRROR ASSEMBLY INCORPORATING A VIDEO SCREEN, and provisional application entitled INTERIOR REARVIEW MIRROR ASSEMBLY INCORPORATING A VIDEO SCREEN, Ser. No. 60/218,336, filed Jul. 14, 2000, (Attorney Docket DON01 P-831), which are incorporated by reference in their entireties herein.

It can be appreciated from the foregoing that the present invention provides a modular design in which a plurality of common components may be assembled to form either a prismatic mirror assembly or an electro-optic interior mirror assembly.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property or privilege I claim are as follows:

1. A vehicle rearview mirror system for a vehicle, said mirror system comprising:

a rearview mirror assembly having a mirror case and a reflective element, said mirror assembly including a mirror mount being adapted to mount to a portion of a vehicle;

a display element having at least one display character emitting a pattern of light to form a display image; and a display screen being provided at said mirror case having a central viewing area generally aligned along a viewing axis, said display element disposed behind said display screen, said at least one display image being offset from said viewing axis, and said display screen having at least one of a refractive property and a diffractive property shifting the display image from the display element to generally align along said viewing axis of said central viewing area of said display screen by at least one of refraction and diffraction.

2. The vehicle rearview mirror system according to claim 1, wherein said reflective element comprises one of a prismatic reflective element and an electrochromic reflective element.

3. The vehicle rearview mirror system according to claim 2, wherein said reflective element comprises a prismatic reflective element.

4. The vehicle rearview mirror system according to claim 1, wherein said display element is mounted on a circuit board, said circuit board being supported in said case.

5. The vehicle rearview mirror system according to claim 1, wherein said case includes a retaining rim.

6. The vehicle rearview mirror system according to claim 5, wherein said reflective element is supported by said retaining rim.

7. The vehicle rearview mirror system according to claim 1, wherein said display screen includes an outer surface and an inner surface, said inner surface angled with respect to said outer surface whereby said image is shifted by refraction.

8. The vehicle rearview mirror system according to claim 7, wherein said display screen comprises a material having an index of refraction in a range of about 1.3 to 1.8.

9. The vehicle rearview mirror system according to claim 8, wherein said material has an index of refraction in a range of about 1.4 to 1.7.

10. The vehicle rearview mirror system according to claim 1, wherein said display screen has a diffractive property wherein said display screen shifts the image by at least diffraction.

11. The vehicle rearview mirror system according to claim 1, further comprising a user actuatable button for actuating a vehicle function, said user actuatable button being located on said mirror case.

12. The vehicle rearview mirror system according to claim 1, wherein said display screen is located on a perimeter portion of said mirror case.

13. The vehicle rearview mirror system according to claim 12, wherein said display screen is located below said reflective element.

14. The vehicle rearview mirror system according to claim 13, wherein said display screen forms a chin area of said mirror case.

15. The vehicle rearview mirror system according to claim 12, wherein said display screen is positioned above said reflective element to form an eyebrow area of said mirror case.

16. The vehicle rearview mirror system according to claim 1, wherein said rearview mirror assembly comprises an interior rearview mirror assembly.

17. A vehicular interior rearview mirror system for a vehicle comprising:
  a rearview mirror assembly having a mirror case and a reflective element, said mirror assembly including a mirror mount being adapted to mount to an interior portion of a vehicle;
  a circuit board being positioned in said mirror case, said circuit board including a light emitting display element for displaying at least one display character emitting a pattern of light to form an image; and
  a display screen being provided at said mirror case, said display screen including a central viewing area having a viewing axis, said image offset from said viewing axis, said display screen having at least one of a diffractive property and a refractive property wherein said display screen shifts said image of said display character to generally align said image in said central viewing area along said viewing axis by at least one of diffraction and refraction.

18. The vehicle interior rearview mirror system according to claim 17, wherein said display element is offset from said viewing axis.

19. The vehicle interior rearview mirror system according to claim 17, wherein said screen comprises a filter.

20. The vehicle interior rearview mirror system according to claim 17, wherein said display screen has at least a refractive property wherein said screen shifts said image by refraction.

21. The vehicle interior rearview mirror system according to claim 20, wherein said screen includes an outer surface and at least one inner surface angled with respect to said outer surface.

22. The vehicle interior rearview mirror system according to claim 21, wherein said screen has a wedge-shaped cross-section.

23. The vehicle interior rearview mirror system according to claim 20, wherein said screen is formed from a material having an index of refraction in a range of 1.3 to 1.8.

24. The vehicle interior rearview mirror system according to claim 23, wherein said material has an index of refraction in a range of 1.45 to 1.65.

25. The vehicle interior rearview mirror system according to claim 17, wherein said display screen has at least a diffractive property wherein said screen shifts said image by diffraction.

26. The vehicle interior rearview mirror system according to claim 25, wherein said screen includes an inner surface and an outer surface, said inner surface being etched with a diffractive surface whereby said diffractive surface shifts said image.

27. The vehicle interior rearview mirror system according to claim 17, wherein said screen is located on a perimeter portion of said mirror case.

28. The vehicle interior rearview mirror system according to claim 27, wherein said screen is located below said reflective element.

29. The vehicle interior rearview mirror system according to claim 28, wherein said screen forms a chin area of said mirror case.

30. The vehicle interior rearview mirror system according to claim 17, wherein said screen is positioned above said reflective element to form an eyebrow area of said mirror case.

31. The vehicle interior rearview mirror system according to claim 17, wherein said reflective element comprises one of a prismatic reflective element and an electrochromic reflective element.

32. The vehicle interior rearview mirror system according to claim 31, wherein said reflective element comprises a prismatic reflective element.

33. A vehicle interior rearview mirror system for a vehicle comprising:
  a rearview mirror assembly having a mirror case and a reflective element, said mirror assembly being adapted to mount to an interior of a vehicle;
  a display element for displaying at least one display character emitting an image; and
  a refractive element having a central viewing display surface aligned along a viewing axis for viewing by an occupant of the vehicle, said image of said display character being offset from said viewing axis, and said refractive element shifting said image of said display character to said central viewing display area for viewing by the occupant of the vehicle.

34. The vehicle interior rearview mirror system according to claim 33, wherein said refractive element comprises a plastic refractive element.

35. The vehicle interior rearview mirror system according to claim 33, wherein said refractive element has an outer surface and an inner surface, said inner surface angled with respect to said outer surface, said image directed toward said inner surface, whereby said refractive element shifts said image to said central viewing area.

36. The vehicle interior rearview mirror system according to claim 35, wherein said refractive element has a wedge-shaped cross-section.

37. The vehicle interior rearview mirror system according to claim 33, wherein said refractive element comprises a filter.

38. The vehicle interior rearview mirror system according to claim 33, further comprising a circuit board, said display element electrically coupled to said circuit board.

39. The vehicle interior rearview mirror system according to claim 38, wherein said display element is mounted to said circuit board.

40. The vehicle interior rearview mirror system according to claim 39, further comprising a user actuatable button for actuating a vehicle function, said user actuatable button being located at said mirror case.

41. The vehicle interior rearview mirror system according to claim 40, wherein said button is mounted to said circuit board.

* * * * *